H. L. BERGERON.
SLED.
APPLICATION FILED JUNE 21, 1916.
1,217,903.
Patented Mar. 6, 1917.
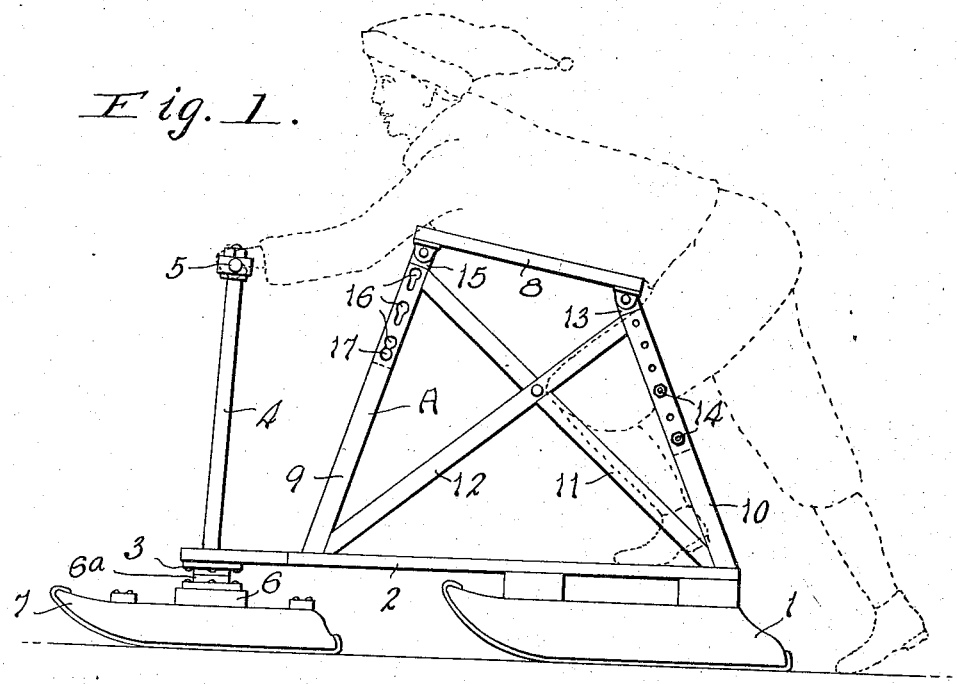
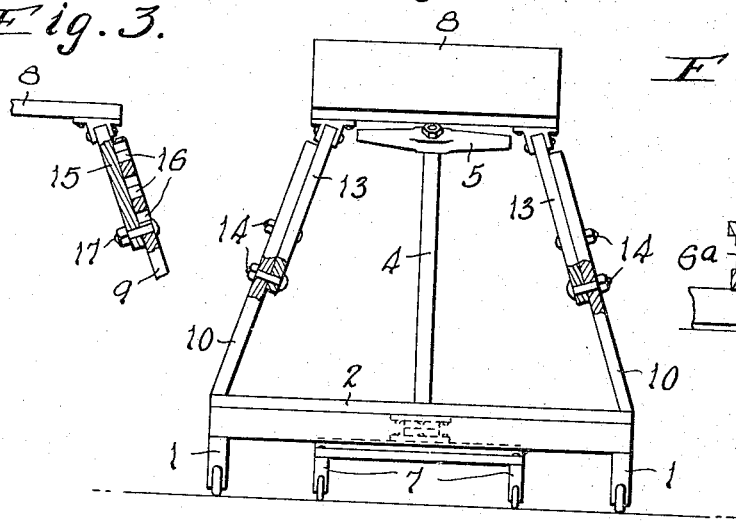
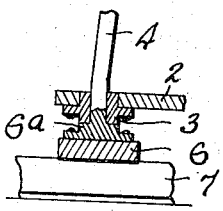
Inventor
H. L. BERGERON
by H. S. Hill Attorney

UNITED STATES PATENT OFFICE.

HENRI LEON BERGERON, OF WALSTONBURG, NORTH CAROLINA.

SLED.

1,217,903.   Specification of Letters Patent.   Patented Mar. 6, 1917.

Application filed June 21, 1916.   Serial No. 104,892.

*To all whom it may concern:*

Be it known that I, HENRI LEON BERGERON, a citizen of the United States, residing at Walstonburg, in the county of Greene, State of North Carolina, have invented a new and useful Sled; and I do hereby declare the following to be a full, clear, and exact description of the invention, such as will enable others skilled in the art to which it appertains to make and use the same.

The present invention relates to certain new and useful improvements in coasting sleds, and has for its object to provide a device of this character which embodies novel features of construction whereby it can be easily propelled by the foot and steered in any direction.

Further objects of the invention are to provide a sled of this character which is comparatively simple and inexpensive in its construction, which provides a rest or support for the body of the operator, which can be adjusted to the comfort of the operator, and which can be steered without difficulty.

With these and other objects in view, the invention consists in certain novel combinations and arrangements of the parts as will more fully appear as the description proceeds, the novel features thereof being pointed out in the appended claims.

For a full understanding of the invention, reference is to be had to the following description and accompanying drawing, in which:—

Figure 1 is a side elevation of a sled constructed in accordance with the invention.

Fig. 2 is a rear view of the same, portions being broken away and shown in section.

Fig. 3 is a detail view of the adjustable connection between the front standards and the swinging arms at the forward end of the body rest, portions being broken away and shown in section.

Fig. 4 is a detail view of the pivotal connection between the forward runners and the top board, portions being shown in section.

Corresponding and like parts are referred to in the following description and indicated in all the views of the drawings by the same reference characters.

Referring to the drawings, the numerals 1 designate the rear runners which are rigidly applied to the rear end of the top 2 at opposite sides thereof. This top 2 extends forwardly beyond the rear runners 1, being provided at the forward end thereof with a bearing 3 which loosely receives an upright steering shaft 4. The upper end of the steering shaft 4 is provided with a cross bar 5 which serves as a handle, while the lower end thereof is rigid with a transverse beam 6 connecting the steering runners 7. A seat 6ª upon the beam 6 provides a rest for the forward end of the top board 2, thereby enabling the front runners to be easily turned through the medium of the steering shaft 4 and handle 5 for the purpose of steering the sled.

A frame A projects upwardly from the top board 2, and supports a body rest 8 against which the operator is designed to place his chest and abdomen when propelling the sled. The frame A includes front standards 9 and rear standards 10, said standards converging toward each other, and the upper ends of the standards being engaged by the respective diagonal braces 11 and 12. The lower ends of the diagonal braces 12 are secured to the lower ends of the upright standards 9, while the lower ends of the diagonal braces 11 are secured to the lower ends of the rear standards 10. The front standards 9 are preferably slightly longer than the rear standards 10, with the result that the body supporting board 8 is normally inclined rearwardly. The operator will rest his chest and abdomen upon the body supporting board 8, grasp the steering handle 5 with his hand, place one foot upon the rear end of the top board 2, and use the other foot for propelling the sled by placing it in engagement with the ground and giving successive forward impulses to the sled.

The body supporting board 8 is preferably mounted in such a manner that it can be raised and lowered to accommodate a tall or a short operator, as well as set at different angles to provide the most comfortable rest for the individual operator. For this purpose the rear end of the body supporting board 8 may be pivotally connected to extensions 13 which are slidable upon the upper ends of the rear standards 10. Suitable means such as the bolts 14 may be provided for locking the extensions 13 in an adjusted position, and by changing the position of the extensions the rear end of the board 8 can be raised and lowered as desired. The forward end of the body supporting board 8 has a pair of braces 15 pivotally connected thereto, the lower ends of the braces being adjustably connected to the front standards 9, so that the inclination of the board 8 can be increased or decreased to provide the most comfortable support for the particular operator using the sled. This adjustable connection between the braces 15 and the forward standards 9 may be provided in any suitable manner, although in the present instance the standards 9 are shown as provided with key-hole slots 16, the braces being provided with bolts 17 having heads which will pass through the large ends of the key-hole slots 16. The bolts may thus be quickly placed in engagement with any selected set of key-hole slots without the necessity of entirely removing the bolts, and when the bolts are tightened a rigid adjustment is obtained.

Having thus described the invention, what I claim as new and desire to secure by Letters Patent, is:—

1. A sled including rear runners, a top attached thereto and projecting in advance of the rear runners, front runners pivotally mounted under the forwardly projecting end of the top, a skeleton frame projecting upwardly from the top, a board carried by the skeleton frame for supporting the chest and abdomen of an operator in a partially standing position with one foot on the top of the sled, an upright steering shaft rigid with the front runners, and a steering handle applied to the steering shaft and arranged in advance of the body supporting board.

2. A sled including rear runners, a top attached to the rear runners and projecting in advance thereof, front runners pivotally mounted under the forwardly projecting end of the top, converging standards projecting upwardly from the top, a rearwardly inclined body supporting board carried by the standards, said body supporting board being designed to receive the chest and abdomen of an operator in a partially standing position with one foot on the top of the sled, an upright steering shaft rigid with the front runners, and a steering handle applied to the steering shaft and arranged in advance of the body supporting board.

3. A sled including rear runners, a top applied to the rear runners and projecting in advance thereof, front runners pivotally mounted under the forwardly projecting end of the top, a skeleton frame projecting upwardly from the top, a body supporting board carried by the skeleton frame and adapted to receive the chest and abdomen of an operator in a partially standing position with one foot on the top of the sled, means for setting the body supporting board at different elevations, an upright steering shaft rigid with the front runners, and a steering handle applied to the steering shaft and arranged in advance of the body supporting board so as to be grasped by the hands of the operator.

4. A sled including rear runners, a top applied to the rear runners and projecting in advance thereof, front runners pivotally mounted under the forwardly projecting end of the top, a skeleton frame projecting upwardly from the top, a body supporting board carried by the skeleton frame and adapted to receive the chest and abdomen of an operator in a partially standing position with one foot on the top of the sled, means for setting the body supporting board at different elevations, means for adjusting the inclination of the body supporting board, an upright steering shaft rigid with the front runners, and a handle applied to the upright steering shaft and arranged in advance of the body supporting board so as to be grasped by the hands of the operator.

5. A sled including rear runners, a top applied to the rear runners and projecting in advance thereof, front runners pivotally mounted under the forwardly projecting end of the top, a skeleton frame projecting upwardly from the top, a body supporting board carried by the skeleton frame and adapted to receive the chest and abdomen of an operator in a partially standing position with one foot on the top of the sled, extensions adjustably mounted upon one side of the skeleton frame and engaging one end of the body supporting board, said extensions providing a means for adjusting the elevation of the body supporting board, a pair of brace members carried by the opposite end of the body supporting board and adjustably engaging the skeleton frame to hold the body supporting board at different inclinations, a steering shaft rigid with the front runners and projecting upwardly therefrom, and a handle applied to the upright steering shaft and arranged in advance of the body supporting board so as to be grasped by the hands of the operator.

6. A sled including rear runners, a top applied to the rear runners and projecting in advance thereof, front runners pivotally mounted under the forwardly projecting end of the top, a skeleton frame projecting upwardly from the top and including front and rear standards, extensions slidably mounted upon one set of standards, the opposite set of standards being formed with key-hole slots, means for locking the extensions in an adjusted position, a body supporting board having one end thereof connected to the extensions, a pair of braces connected to the opposite end of the body supporting board, bolts applied to the braces for engagement with selected key hole slots, the extensions and braces enabling the body supporting board to be set at different elevations and inclinations, and the said body supporting board being adapted to receive the chest and abdomen of an operator in a partially standing position with one foot on the top of the sled, an upright steering shaft rigid with the front runners, and a handle applied to the upright steering shaft and arranged in advance of the body supporting board so as to be grasped by the hands of the operator.

In testimony whereof I have signed my name to this specification in the presence of two subscribing witnesses.

HENRI LEON BERGERON.

Witnesses:
CALVIN A. TYNDALL,
ZADOCK B. BERGERON.

Copies of this patent may be obtained for five cents each, by addressing the "Commissioner of Patents, Washington, D. C."